(12) United States Patent
Hsu

(10) Patent No.: US 6,931,755 B1
(45) Date of Patent: Aug. 23, 2005

(54) DEHUMIDIFIER AS EFFECTED BY MOISTURE EXCHANGE

(76) Inventor: Tsang-Hung Hsu, 14 Floor, No. 632, Ta-Yu Road, Taoyuan City (TW)

( * ) Notice: Subject to any disclaimer, the term of this patent is extended or adjusted under 35 U.S.C. 154(b) by 0 days.

(21) Appl. No.: 10/957,362

(22) Filed: Oct. 4, 2004

(51) Int. Cl.$^7$ .............................................. F26B 21/06
(52) U.S. Cl. ........................................ 34/80; 34/218
(58) Field of Search ............................... 34/60, 68, 79, 34/80, 81, 218; 62/314, 498; 95/195, 198; 96/151, 152

(56) References Cited

U.S. PATENT DOCUMENTS

| | | | |
|---|---|---|---|
| 1,984,605 A * | 12/1934 | Strang et al. .................. | 62/262 |
| 3,857,687 A * | 12/1974 | Hamilton et al. .............. | 55/337 |
| 5,119,571 A * | 6/1992 | Beasley ........................ | 34/446 |
| 5,230,719 A * | 7/1993 | Berner et al. ................. | 96/144 |
| 5,343,632 A * | 9/1994 | Dinh ............................ | 34/507 |
| 5,709,038 A * | 1/1998 | Scheufler et al. ............. | 34/475 |
| 6,094,835 A * | 8/2000 | Cromer ......................... | 34/80 |
| 6,558,640 B1 * | 5/2003 | Nottingham et al. ........ | 422/307 |

* cited by examiner

Primary Examiner—Stephen Gravini

(57) ABSTRACT

A dehumidifier includes: a housing, a fan axially mounted in the housing along a longitudinal axis of the housing, and a moisture-exchange device having a plurality of thin flat air-penetrable ducts radially disposed in the housing and having a dehydrating chamber filled with desiccant material in the chamber between the fan and an outer shell of the housing; whereby the ambient air will be drafted by the fan and blown radially outwardly by the fan through the air-penetrable ducts to allow the desiccant material to absorb the moisture as laden in the air through the ducts for efficiently dehumidifying the air.

10 Claims, 5 Drawing Sheets

DEHUMIDIFIER AS EFFECTED BY MOISTURE EXCHANGE

BACKGROUND OF THE INVENTION

U.S. Pat. No. 4,756,726 to Terry Peace disclosed a dehumidifier device comprising a container comprised of several elongated compartments in parallel juxtaposition and desiccant granules confined within the container for absorbing moisture for dehumidification purpose. However, such a dehumidifier can only absorb water vapor from ambient air very near the dehumidifier. Except that a forced-draft air circulation system or mechanism is provided to increase the contacting opportunity of the ambient air with such a dehumidifier, the water absorption rate by the dehumidifier is quite low, thereby affecting its dehumidification efficiency.

The present inventor has found the drawbacks of the prior art and invented the present dehumidifier having increased dehumidification efficiency.

SUMMARY OF THE INVENTION

The object of the present invention is to provide a dehumidifier including: a housing, a fan axially mounted in the housing along a longitudinal axis of the housing, and a moisture-exchange device having a plurality of thin flat air-penetrable ducts radially disposed in the housing and having a dehydrating chamber filled with desiccant material in the chamber between the fan and an outer shell of the housing; whereby the ambient air will be drafted by the fan and blown radially outwardly by the fan through the air-penetrable ducts to allow the desiccant material to absorb the moisture as laden in the air through the ducts for efficiently dehumidifying the air.

DETAILED DESCRIPTION

Figure 1:
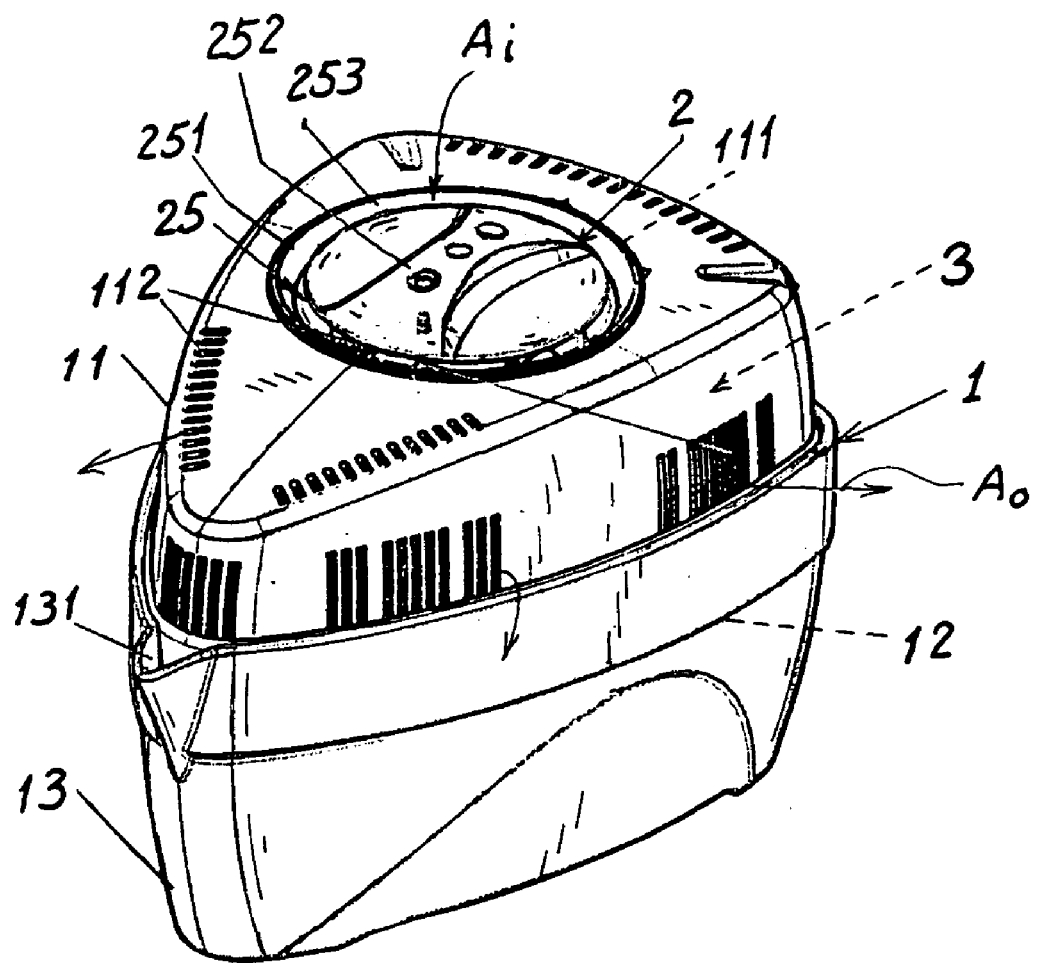
FIG. 1 is a perspective view of the present invention when assembled.
Figure 2:
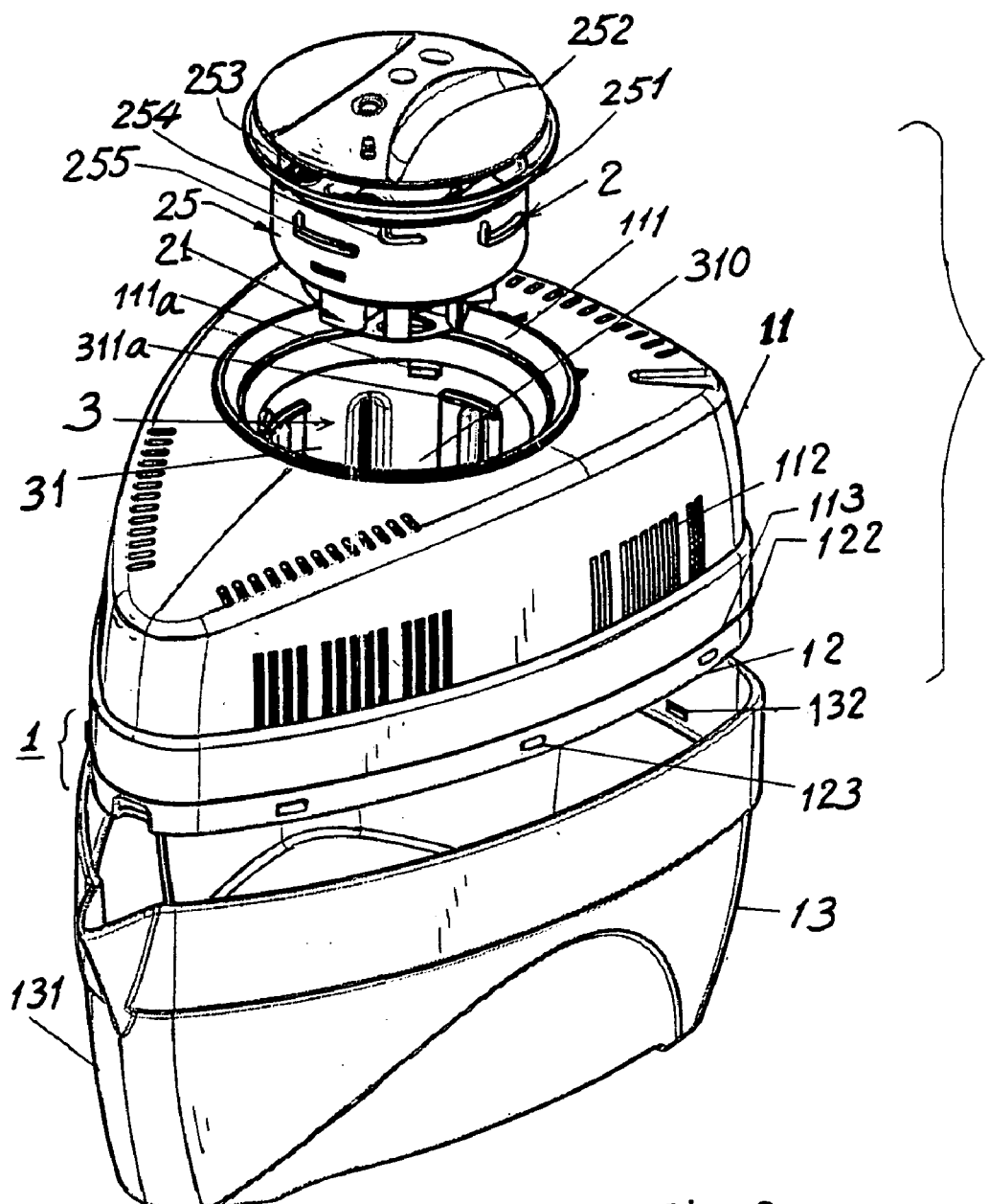
FIG. 2 is a partially exploded view of the present invention.

As shown in the drawing figures, the dehumidifier of the present invention comprises: a housing 1, a fan device 2 axially and detachably mounted in the housing 1 along a longitudinal axis X defined at a longitudinal center of the housing 1, and a moisture-exchange device 3 formed in between the fan device 2 and the housing 1. Even a triangular-like shape of the outer appearance of the present invention is shown in the drawings, the shapes of the present invention are however not limited. The present invention is preferably made as a portable dehumidifier for its convenient uses in a room, a cabinet, a closed container, and so on.

The housing 1 includes: an outer shell 11, a sieve plate 12 engaged with a lower edge portion of the outer shell 11, and a basin 13 detachably secured to a bottom rim of the sieve plate 12.

The outer shell 11 includes an upper conical portion 111 formed in an upper central portion of the shell 11 for receiving an upper hopper portion 251 of a casing 25 of the fan device 2, a plurality of venting holes (or slots) 112 cut out or formed in the outer shell 11 for discharging the dehumidified air from the moisture-exchange device 3 formed in the housing 1, and a lower edge portion 113 of the shell 11 engaged with a bottom rim 122 of the sieve plate 12 (FIG. 3) for combining the outer shell 11 with the sieve plate 12 which is detachably mounted on the basin 13.

The sieve plate 12 includes a plurality of drain holes (or slits or perforations) 121 formed through the plate 12 for draining the saturated water droplets from the desiccant material as filled in the moisture-exchange device 2 secured in the housing 1, a bottom rim 122 engaged with the lower edge portion 113 of the outer shell 11, and a plurality of projections 123 circumferentially formed on the bottom rim 122 to be engaged with a plurality of recesses 132 formed in the basin 13 for detachably engaging the sieve plate 12 on the basin 13.

The basin 13 includes a spout 131 formed on an upper front portion of the basin for discharging the saturated water in the basin as drained from the sieve plate 12, and a plurality of recesses 132 circumferentially formed in an upper portion of the basin to be engaged with the projections 123 of the sieve plate 12 for detachably combining the sieve plate 12 (which is already combined with the outer shell 11) with the basin 13. The basin 13 is positioned under the sieve plate 12 and under the moisture-exchange device 3 for collecting the saturated water as drained from the moisture-exchange device 3.

The moisture-exchange device 3 as designated and defined in the present invention is based on the idea and principles of heat exchange or ion exchange effect. The moisture as laden or contained in the ambient air, when passing through the moisture-exchange device 3 of the present invention, will be absorbed by the desiccant material or dehydrating agent 30 as filled in the moisture-exchange device 3 to be "exchanged" (or transferred) from the air streamflow into the molecules of the desiccant material 30 to be absorbed therein accordingly.

The desiccant material 30 may be selected from calcium chloride or any other suitable dehydrating agents or moisture-absorbing materials, not limited in the present invention.

The moisture-exchange device 3 includes: an inner hood 31 cylindrically shaped for confining the fan device 2 within the inner hood 31, a plurality of thin flat air-penetrable ducts 32 radially connected to the inner hood 31, an outer hood 33 circumferentially connected with the ducts 32 and juxtapositioned to the outer shell 11 and a (or an annular) dehumidifying chamber 34 between the inner hood 31 and the outer hood 33, and a desiccant material (or dehydrating agent) 30 formed as granules and filled in the dehumidifying chamber 34; with the sieve plate 12 integrally formed or connected with the lower portion of the inner hood 31 and the outer hood 33 to confine the dehumidifying chamber 34 in the inner hood 31 and the outer hood 33 and within the outer shell 11 and the sieve plate 12.

The inner hood 31 is formed with a plurality of air inlet ports 311 which are fluidically communicated with an air chamber 310 confined within the inner hood 31, the sieve plate 12 and the top cover 252; and having the fan device 2 accommodated in the air chamber 310 for directing air streamflow of the ambient air (Ai) as inwardly sucked by the fan device 2 and outwardly blown into the air-penetrable ducts 32 for dehumidifying the air.

The thin flat air-penetrable duct 32 includes a plurality of sits 321 (or apertures, or perforations) formed through opposite side walls of the duct 32 to allow the moisture laden in the air passing through the duct to be absorbed by the desiccant material 30 filled in the dehumidifying chamber 34 for dehumidifying the air.

Each duct 32 may have a total width (W) of 3~5 mm, with an air passage defined between the opposite side walls of the duct having a width (A) of 1~3 mm; and each slit 321 having a width (S) of 0.1~1 mm to be smaller than the granule of the desiccant material. However, the dimensions of the elements of the present invention are not limited.

Figure 3:
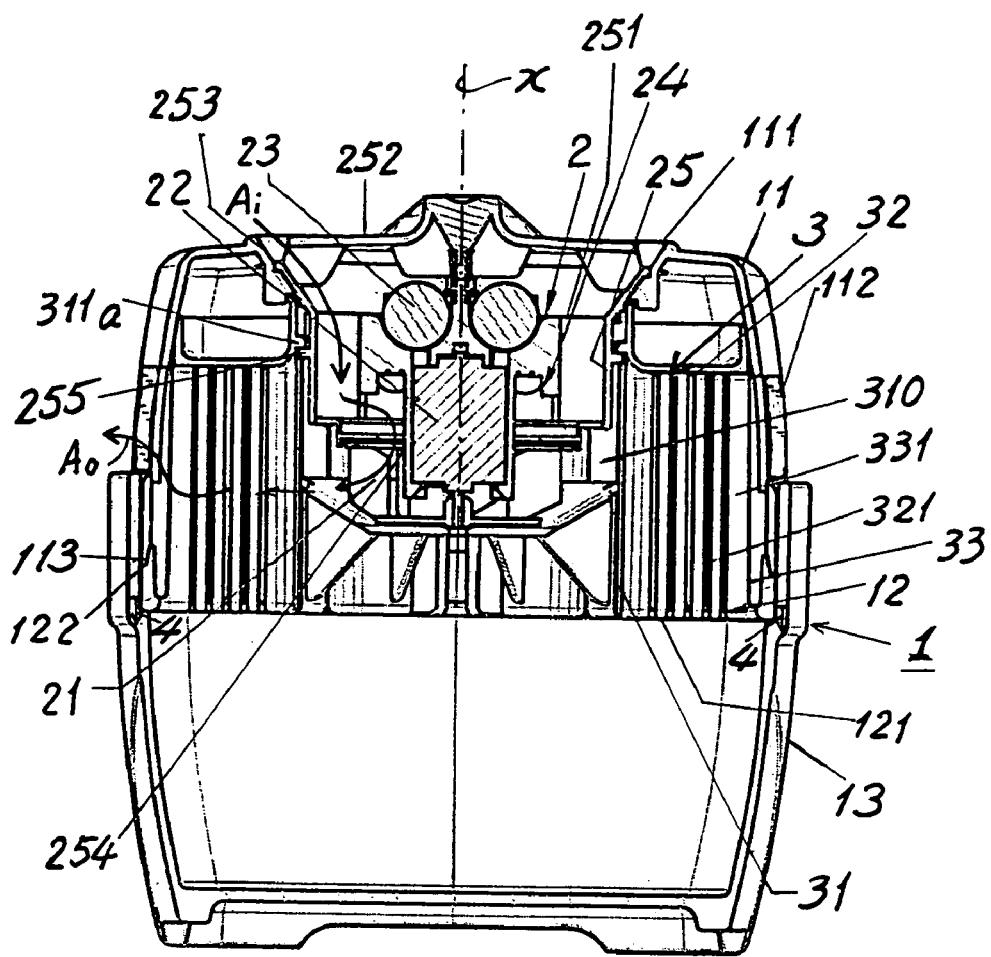
FIG. 3 is a sectional drawing of the present invention.
Figure 4:
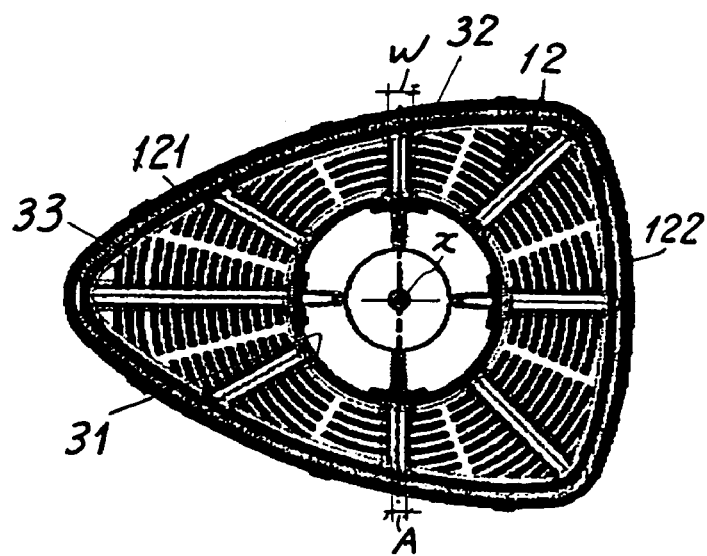
FIG. 4 is a partial cross sectional drawing of the present invention when viewed from Line 4—4 of FIG. 3.

The outer hood 33 includes a plurality of air outlet ports 331 to be fluidically communicated with the venting holes 112 formed in the outer shell 11 for discharging the dehumidified air (Ao) outwardly from the ducts 32, the outer hood 33 and the outer shell 11 (FIGS. 1 and 3).

The fan device 2 includes: a fan 21 axially connected to a fan motor 22, a power source 23 comprised of a plurality of batteries electrically connected to the fan motor 22, an electronic circuit formed on a circuit board 24, and a casing 25 detachably secured in the outer shell 11 of the housing 1 and in the moisture-exchange device 3 for mounting the fan 21, the fan motor 22, the power source 23, and the circuit board 24 in the casing 25.

The fan 21 is axially secured to the fan motor 22 about a longitudinal axis X of the housing 1 and rotatably mounted in the casing 25 which is detachably secured in the housing 1. The fan 21 is positioned in the air chamber 310 in the moisture-exchange device 3. A power indicator 231 may be provided for showing the device as powered, which may be observed through the cover 252.

The circuit board 24 has the electronic circuit formed thereon for controlling the powering from the batteries 23 and the operation of the fan 21.

The casing 25 includes: an upper hopper potion 251 snugly engaged with the upper conical portion 111 of the outer shell 11 of the housing 1, a top cover 252 detachably secured to an upper portion of the casing 25 for detachably covering the power source of batteries 23 (FIGS. 6 and 3), an air incoming hole 253 formed or annularly formed or defined in between the top cover 252 and the outer shell 11 to direct an air streamflow Ai from the ambient air through an air passage 254 formed through an interior in the casing 25 as sucked by the fan 21 and then blown radially outwardly (Ao) through the ducts 32 of the moisture-exchange device 3 (FIG. 3). The casing 25 is received into the chamber 310 in the inner hood 31.

The top cover 252 may include several protrusions 252a to be engaged with plural recesses 251a as formed in the hopper portion 251 of the casing 25 so that the cover 252 may be stably engaged with the casing 25 (FIG. 1).

The casing 25 includes several pairs of threads 254, 255 for respectively engaging the corresponding lower threads 111a, 311a respectively formed on the upper conical portion 111 of the outer shell 11 and on the upper portion of the inner hood 31 so that the casing 25 will be engaged with the outer shell 1 and the moisture-exchange device 2 simultaneously. The threads may also be modified to be tenons and sockets or any other male and female engagement mechanisms, not limited in the present invention.

When using the present invention for dehumidification, the ambient air streamflow Ai is sucked by the fan 21 through the hole 253, the air passage 254 to be blown raidally outwardly through the air-penetrable ducts 32, through that the moisture in the air will be "exchanged" into and absorbed by the desiccant material 30 in the dehumidifying chamber 34 of the moisture-exchange device 3. Accordingly, the air streamflow Ao discharged outwardly through the ducts 32, the outlet ports 331 of the hood 33, the venting holes 112 of the shell 1 will be efficiently dehumidified and dried. The air streamflow (Ai, Ao) is operated as forced draft by the fan device 2. And each duct 32 is made so thin (W=3~5 mm) and flat to thereby increase the contacting area of the air (through the slits 321) with the desiccant material 30 to increase the water absorption rate or dehumidification efficiency of the present invention.

Nevertheless, the outwardly flowing air streamflow Ao is still stably "guided" and discharged through the duct 32 having a cross section (along its air flow path) generally formed as a rectangular shape. Therefore, the air is directed or guided very smoothly and efficiently, without being retarded or dampened by the desiccant material or dehydrating agent 30 since the desiccant material 30 does not hinder the air flowing path (or passage) through each duct 32. The air flowing through the "thin" duct will get "rich" contacting area with the granules of the desiccant material 30, thereby increasing the dehumidification efficiency and also enhancing a smooth outward air streamflow which can be blown for a longer distance for drying the ambient air in a wider area.

Figure 5:
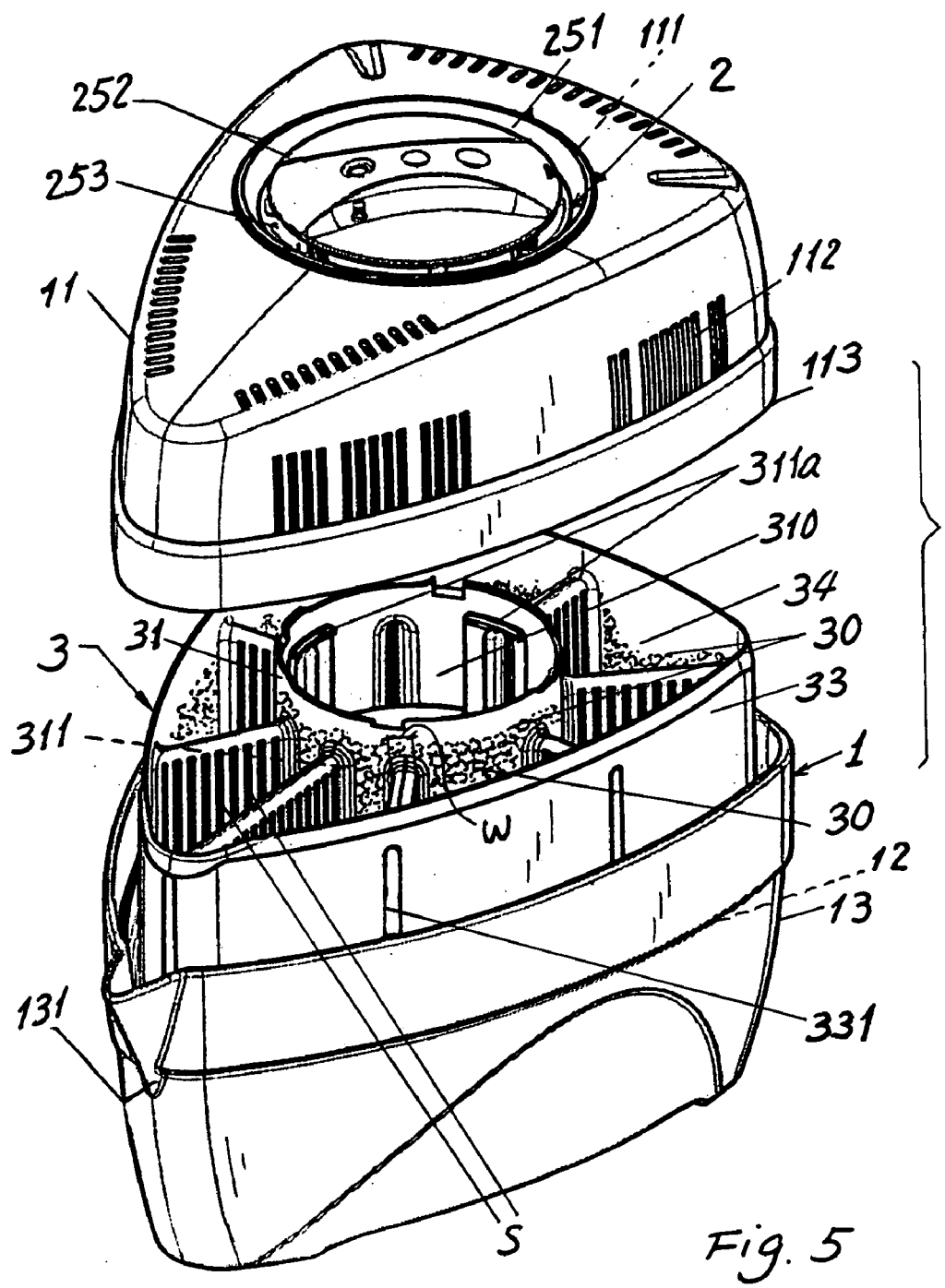
FIG. 5 is an illustration showing the removal of outer shell and the fan device to indicate the interior of the present invention.

For replacing the desiccant material, the casing 25 and the shell 11 may be detached and the desiccant material is then re-filled into the chamber 34 in the moisture-exchange device 3 as shown in FIG. 5.

Figure 6:
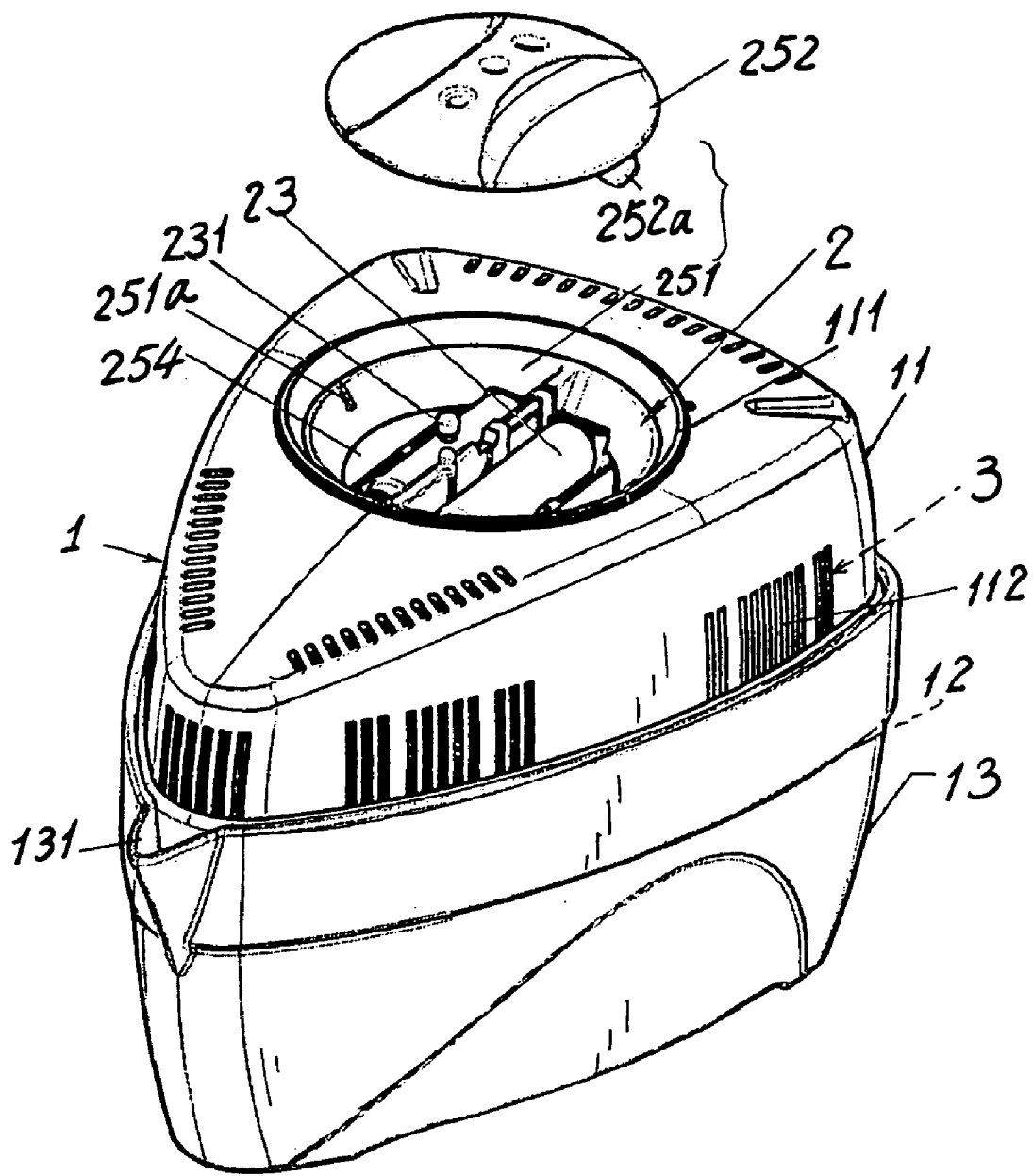
FIG. 6 shows the removal of the top cover of the present invention.

For changing the batteries for maintenance, the top cover 252 is opened as shown in FIG. 6 for substituting new batteries into the casing 25.

The present invention may be modified without departing from the spirit and scope of the present invention.

I claim:

1. A dehumidifier comprising:
   a housing;
   a fan device detachably mounted in said housing; and
   a moisture-exchange device formed in between said fan device and said housing; having desiccant material filled in said moisture-exchange device;
   said fan device operatively sucking air inwardly from ambient air through said moisture-exchange device to allow moisture laden or contained in the air to be contacted with and absorbed by the desiccant material for dehumidifying the air, and operatively discharging the air as dehumidified outwardly.

2. A dehumidifier according to claim 1, wherein said housing includes an outer shell having a plurality of venting holes formed through said outer shell for outwardly discharging air as dehumidified by said moisture-exchange device; a sieve plate having a plurality of drain holes formed through the plate for downwardly draining water from said desiccant material as saturated with water; and a basin detachably mounted under said sieve plate for collecting the water as downwardly drained through said sieve plate.

3. A dehumidifier according to claim 2, wherein said outer shell includes an upper conical portion formed on a central upper portion for receiving an upper hopper portion of a casing of said fan device on said upper conical portion, and a lower edge portion of said shell detachably engaged with a bottom rim of said sieve plate.

4. A dehumidifier according to claim 2, wherein said basin includes a spout for discharging the water as collected in said basin.

5. A dehumidifier according to claim 1, wherein a casing of said fan device includes a top cover detachably mounted on an upper portion of said casing; said top cover having an air incoming hole defined in between said top cover and an outer shell of the housing for directing air inwardly, when sucked by said fan device, to be dehumidified by said moisture-exchange device.

6. A dehumidifier according to claim 1, wherein said moisture-exchange device includes: an inner hood for mounting said fan device in said inner hood for confining said fan device within said inner hood, said sieve plate and a top cover of said fan device; a plurality of thin flat air-penetrable ducts radially connected between said inner hood fluidically communicated with said fan device and an outer hood which is juxtapositioned to and fluidically communicated with said outer shell; and a dehumidifying chamber defined within said inner and said outer hoods, said sieve plate and said outer shell for filling said desiccant material in said dehumidifying chamber for absorbing moisture contained in the air through said air-penetrable ducts; whereby the air as driven by said fan device will be radially blown outwardly through said ducts to be dehumidified and then discharged outwardly through a plurality of venting holes formed in said outer shell juxtopositioned to said outer hood.

7. A dehumidifier according to claim 1, wherein said fan device includes a fan axially secured to a fan motor secured in a casing formed in a central portion in said housing and in said moisture-exchange device, a power source electrically connected to said motor, and a top cover detachably mounted on said casing for maintaining the power source.

8. A dehumidifier according to claim 6, wherein said air-penetrable duct includes a plurality of slits formed through opposite side walls of said duct to allow moisture in the air passing through said duct to be absorbed by the desiccant material in said dehumidifying chamber of said moisture-exchange device.

9. A dehumidifier according to claim 1, wherein a casing of said fan device is formed with at least a pair of threads on said casing to be respectively engaged with a first lower thread formed in said outer shell and a second lower thread formed in said moisture-exchange device for detachably combining said casing with said outer shell and said moisture-exchange device simultaneously.

10. A dehumidifier according to claim 6, wherein each said duct is internally communicated with an air inlet port formed through said inner hood, and said duct externally communicated with an air outlet port formed through said outer hood.

\* \* \* \* \*